(12) United States Patent
Cippitani

(10) Patent No.: US 9,200,598 B2
(45) Date of Patent: Dec. 1, 2015

(54) PUMP ASSEMBLY IS PROVIDED, HOUSED INSIDE AN LPG FUEL TANK FOR MOTOR VEHICLES, WHICH CAN BE REMOVED WITHOUT HAVING TO FIRST EMPTY THE TANK

(75) Inventor: Luciano Cippitani, Nettuno (IT)

(73) Assignee: ICOMET SPA (IT)

( * ) Notice: Subject to any disclaimer, the term of this patent is extended or adjusted under 35 U.S.C. 154(b) by 19 days.

(21) Appl. No.: 13/138,409

(22) PCT Filed: Feb. 18, 2010

(86) PCT No.: PCT/IT2010/000061
§ 371 (c)(1),
(2), (4) Date: Aug. 11, 2011

(87) PCT Pub. No.: WO2010/097826
PCT Pub. Date: Sep. 2, 2010

(65) Prior Publication Data
US 2011/0290220 A1 Dec. 1, 2011

(30) Foreign Application Priority Data

Feb. 27, 2009 (IT) .............................. RM2009A0091

(51) Int. Cl.
*F02M 21/02* (2006.01)
*F02M 37/10* (2006.01)

(52) U.S. Cl.
CPC ....... *F02M 21/0221* (2013.01); *F02M 21/0212* (2013.01); *F02M 21/0245* (2013.01); *F02M 37/103* (2013.01); *Y02T 10/32* (2013.01)

(58) Field of Classification Search
CPC .......... F02M 21/0212; F02M 21/0221; F02M 21/0245; F02M 37/103; Y02T 10/32
USPC .......... 220/724, 564; 417/360, 307; 123/509, 123/516, 459, 458, 497, 506, 198 C, 123/198 DB; 137/574, 576, 544
See application file for complete search history.

(56) References Cited

U.S. PATENT DOCUMENTS 5,632,907 A    5/1997   Norbury
5,680,847 A  * 10/1997  Begley et al. ................. 123/509
(Continued)

FOREIGN PATENT DOCUMENTS

IT    BO2007A000659   * 10/2008   ............. F16K 31/06
JP        2004 130977 A     4/2004
(Continued)

OTHER PUBLICATIONS

European Search Report Mailed Nov. 14, 2014, for EP Application No. 10 711 740.0-1606.
(Continued)

*Primary Examiner* — Erick Solis
*Assistant Examiner* — Carl Staubach
(74) *Attorney, Agent, or Firm* — Hershkovitz & Associates, PLLC; Abe Hershkovitz

(57) ABSTRACT

A device for housing a pump in a tank is described. Such a device includes a gastight container where the pump is accommodated, fitted within the tank and accessible from the outside of the tank. The gastight container received LPG from the tank and the pump is fed with the LPG present in the container. Should the LPG pump break, it is sufficient to drain the gastight container that accommodates the pump removing the small amount of LPG present in it, loosening the lid of the gastight container and removing the faulty pump, with no need to drain the entire tank of the LPG contained in it.

13 Claims, 5 Drawing Sheets

(56) References Cited

U.S. PATENT DOCUMENTS

| | | | |
|---|---|---|---|
| 6,129,529 A * | 10/2000 | Young | F04D 9/001 417/423.14 |
| 6,412,588 B1 * | 7/2002 | Scott et al. | 180/314 |
| 6,675,778 B1 | 1/2004 | Kemper et al. | |
| 6,904,896 B2 * | 6/2005 | Ricco et al. | 123/509 |
| 6,923,208 B2 * | 8/2005 | Okabe et al. | 137/565.22 |
| 7,047,947 B2 * | 5/2006 | Van Dyke | 123/509 |
| 8,146,575 B2 | 4/2012 | Cippitani | |
| 8,180,556 B2 | 5/2012 | Cippitani | |
| 8,714,194 B2 * | 5/2014 | Kim | F02M 21/0212 123/509 |
| 2004/0182452 A1 | 9/2004 | Ricco et al. | |
| 2010/0119387 A1 | 5/2010 | Malec et al. | |
| 2010/0307614 A1 * | 12/2010 | Basaglia et al. | 137/544 |

FOREIGN PATENT DOCUMENTS

| | | |
|---|---|---|
| JP | 2004 169690 A | 6/2004 |
| WO | WO 2009/040637 A2 | 4/2009 |

OTHER PUBLICATIONS

English translation and Abstract for JP 2004 169690 A—equivalent EP Publication No. 2004 169690.

English translation and Abstract for JP 2004 130977 A—equivalent EP Publication No. 2004 130977.

* cited by examiner

PUMP ASSEMBLY IS PROVIDED, HOUSED INSIDE AN LPG FUEL TANK FOR MOTOR VEHICLES, WHICH CAN BE REMOVED WITHOUT HAVING TO FIRST EMPTY THE TANK

FIELD OF THE INVENTION

Generally speaking, liquid-injection LPG fuel systems operate as follows: the LPG contained inside the tank is driven by a pump and injected by means of the rail feeding the LPG injectors—located on the intake manifold—through the pressure regulator, and then returns to the tank according to an operating principle similar to a petrol engine.

Inside the rail the pressure of the LPG must be capable of maintaining the fuel in the liquid state, in excess of the vapour pressure, which varies between 2 and 4 bars; in order to achieve this, the LPG tank contains a pump assembly for maintaining the LPG under pressure, while a pressure regulator keeps it at the right pressure.

The LPG pump assembly inside the tank is, therefore, a key component of the system.

At present, if the LPG pump fails or breaks down for any reason, it must be removed from inside the tank before it can be repaired or replaced.

In order to remove the pump, however, it is first necessary to empty the tank of the LPG it contains at the time of the failure, an operation which can cause a lot of trouble; the tank, in fact, must be emptied by specialised personnel, in safe conditions, and the time required to empty even a medium-sized LPG tank can be very long.

It is obvious, therefore, that, currently, the removal of the LPG pump is a time-consuming and costly operation, which entails, aside from the operations mentioned above, the loss of the LPG contained in the tank and, of course, the inability to use the vehicle for a period of time.

The present invention aims at solving this problem by permitting the removal of the pump assembly without having to first empty the tank from the LPG it contains.

DESCRIPTION OF THE INVENTION

According to the present invention, this can be achieved by placing the LPG pump assembly inside a sealed container, a part of which is housed inside the fuel tank, covered externally by a cap, the container and its cap being sealed together at a suitably sized hole in the flange normally present on LPG fuel tanks, which supports the assemblies for the operation and safety of the system; the container receives the LPG fuel through a pipe that dips into the tank, and is fitted with a device for shutting off the flow of fuel, which device can be activated from outside the tank, for example a tap cock or faucet on the external face of the flange, inside the cap it is integral with the LPG pump and through the cap passes a sealed intake pipe conveying the LPG fuel to the engine; the pump assembly, according to the present invention, feeds fuel to the engine, enclosed inside its sealed container, and is supplied by the LPG fuel present inside the container. When the tap cock is closed, the only channel of communication of the LPG fuel between the fuel tank and the sealed container housing the pump assembly (and, therefore, with the outside) is shut off; thus, if one needs to take out the pump assembly, it is sufficient to remove the little amount of LPG fuel from the sealed pump assembly container, and the section of pipe downstream from the tap cock, unscrew the cap of the container from the flange and remove the pump assembly with it.

It is obvious, therefore, that this invention can considerably reduce the time and cost needed to take out and replace the fuel pump assembly, given that practically all the fuel contained in the tank remains safely inside the tank, the only channel with the outside having been closed by means of the tap cock that opens/closes the flow of LPG from the fuel tank to the pump assembly container.

DESCRIPTION OF THE DRAWINGS

The preferred embodiment of the invention will now be described by way of example, with reference to the accompanying drawings, in which.

DESCRIPTION OF AN EXAMPLE OF CONSTRUCTION

Figure 1:
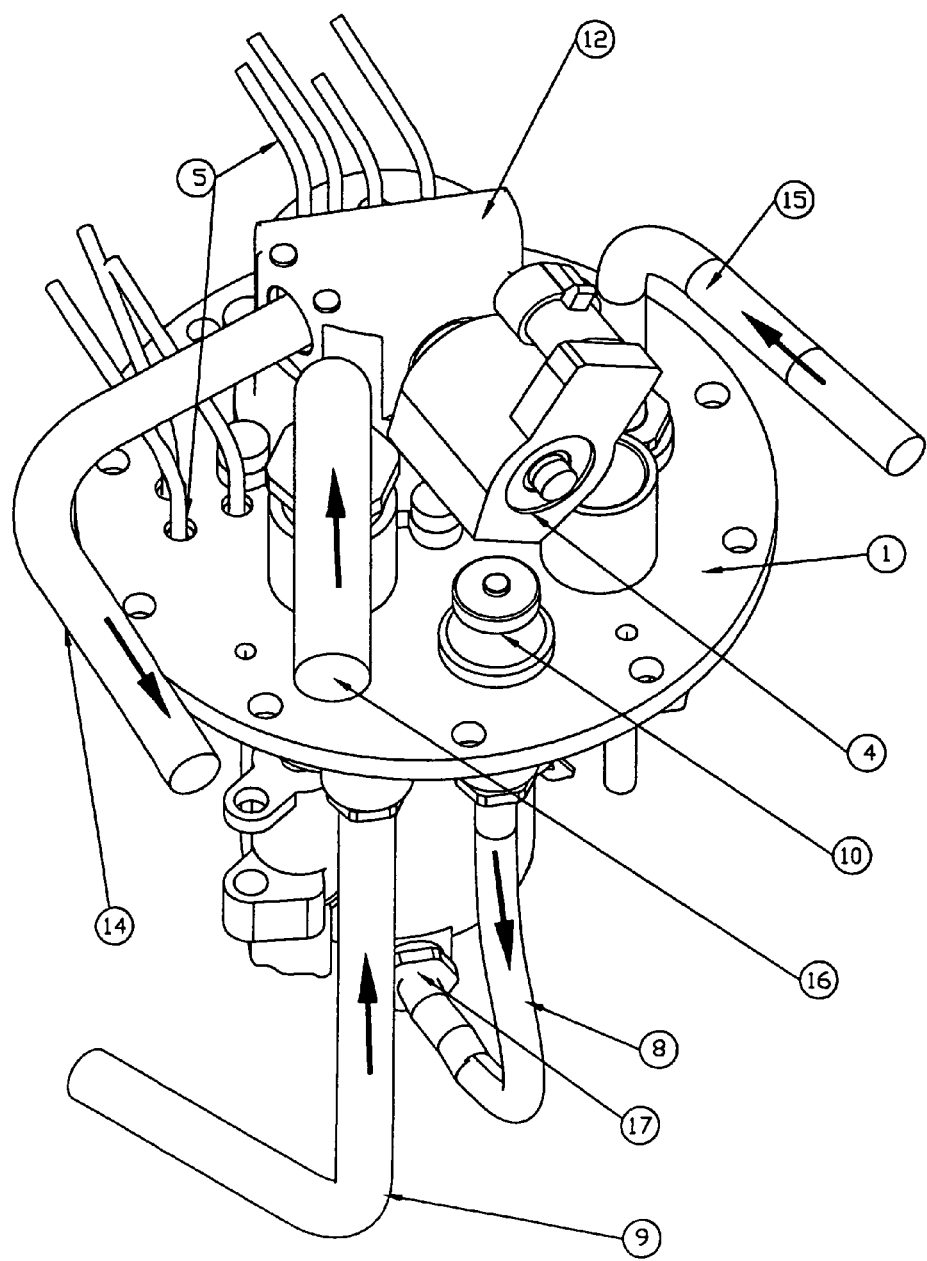
FIG. 1 shows a view of the flange from the top, with the installed assemblies.
Figure 2:
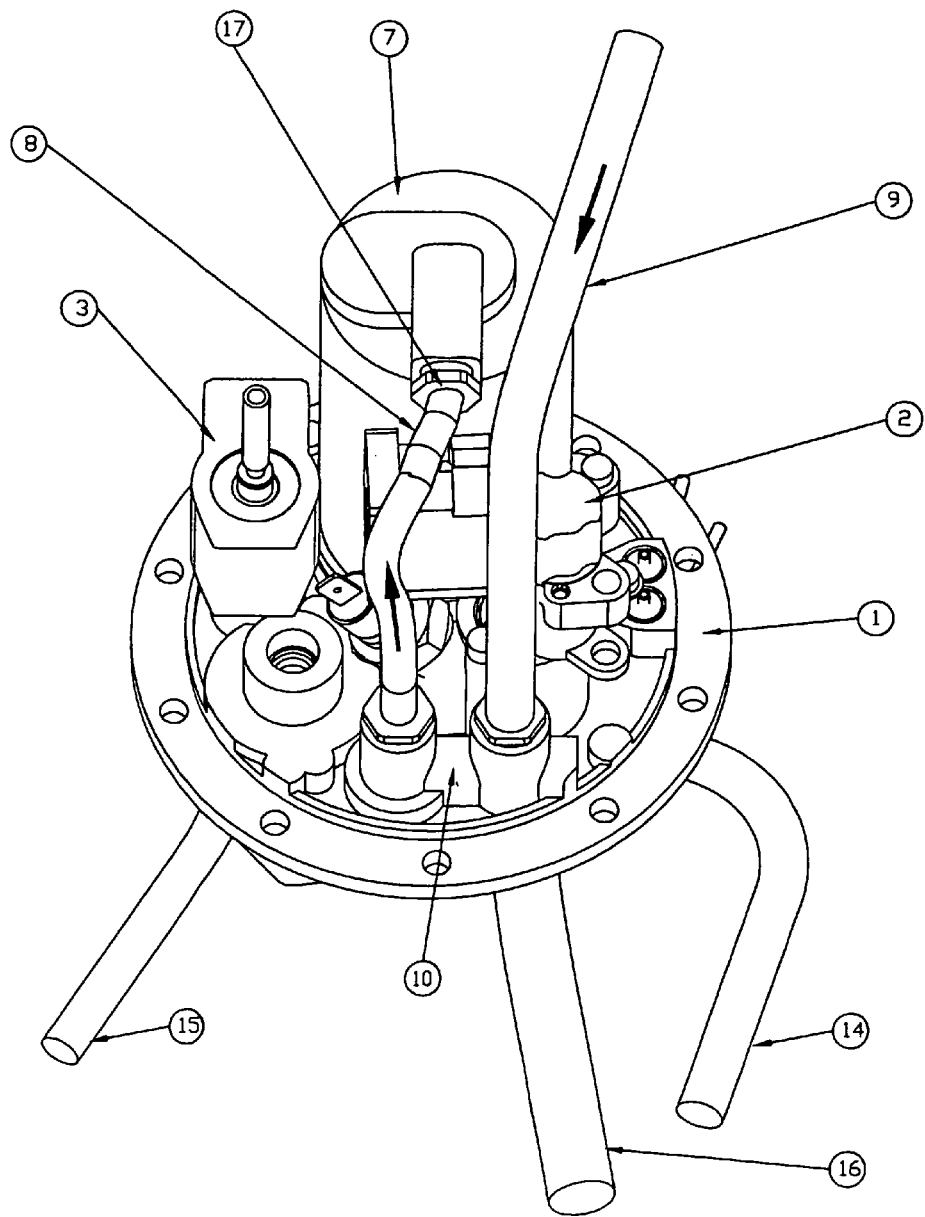
FIG. 2 shows a view of the flange from the bottom, with the installed assemblies.
Figure 3:
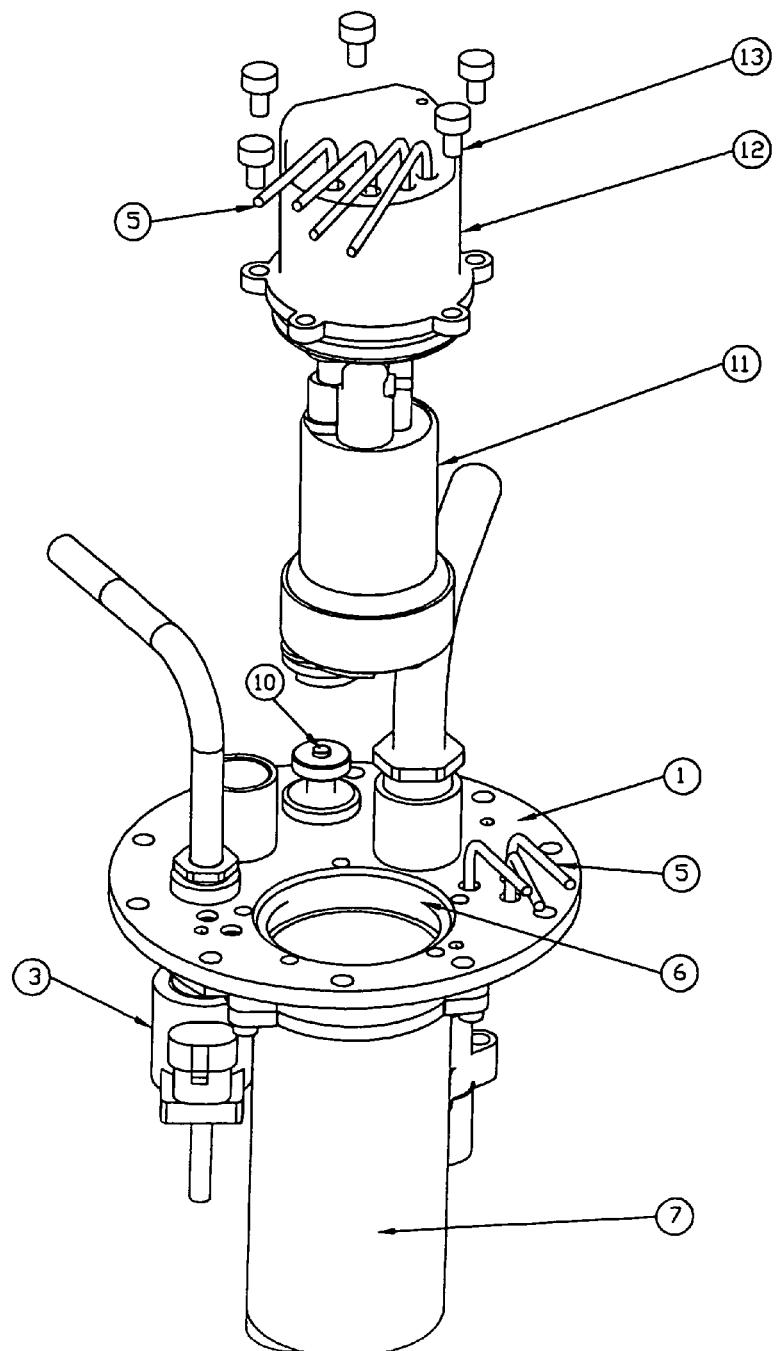
FIG. 3 shows an exploded view of the flange and of several key assemblies.
Figure 4:
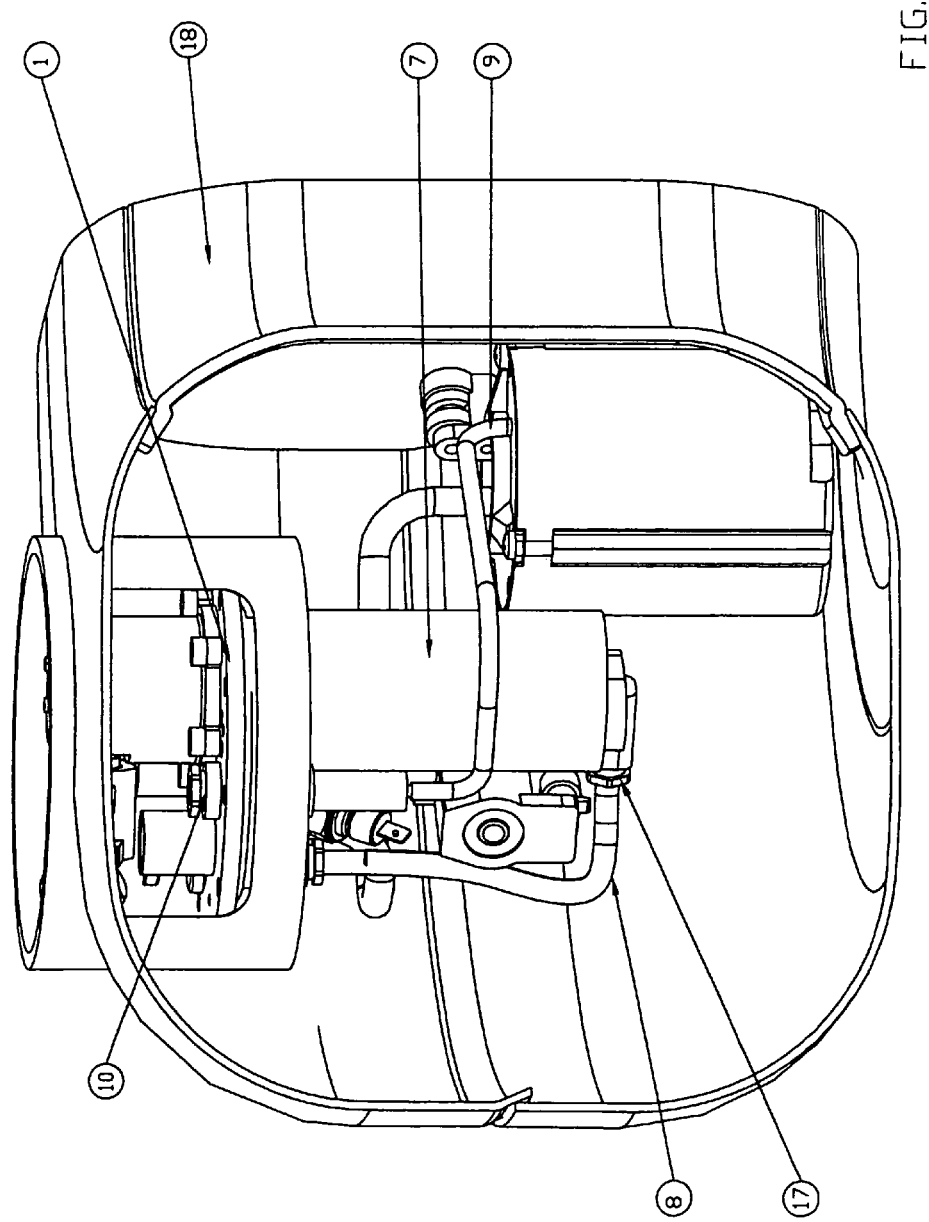
FIG. 4 shows a cross section of the flange and of the sealed pump assembly container housed inside the fuel tank.
Figure 5:
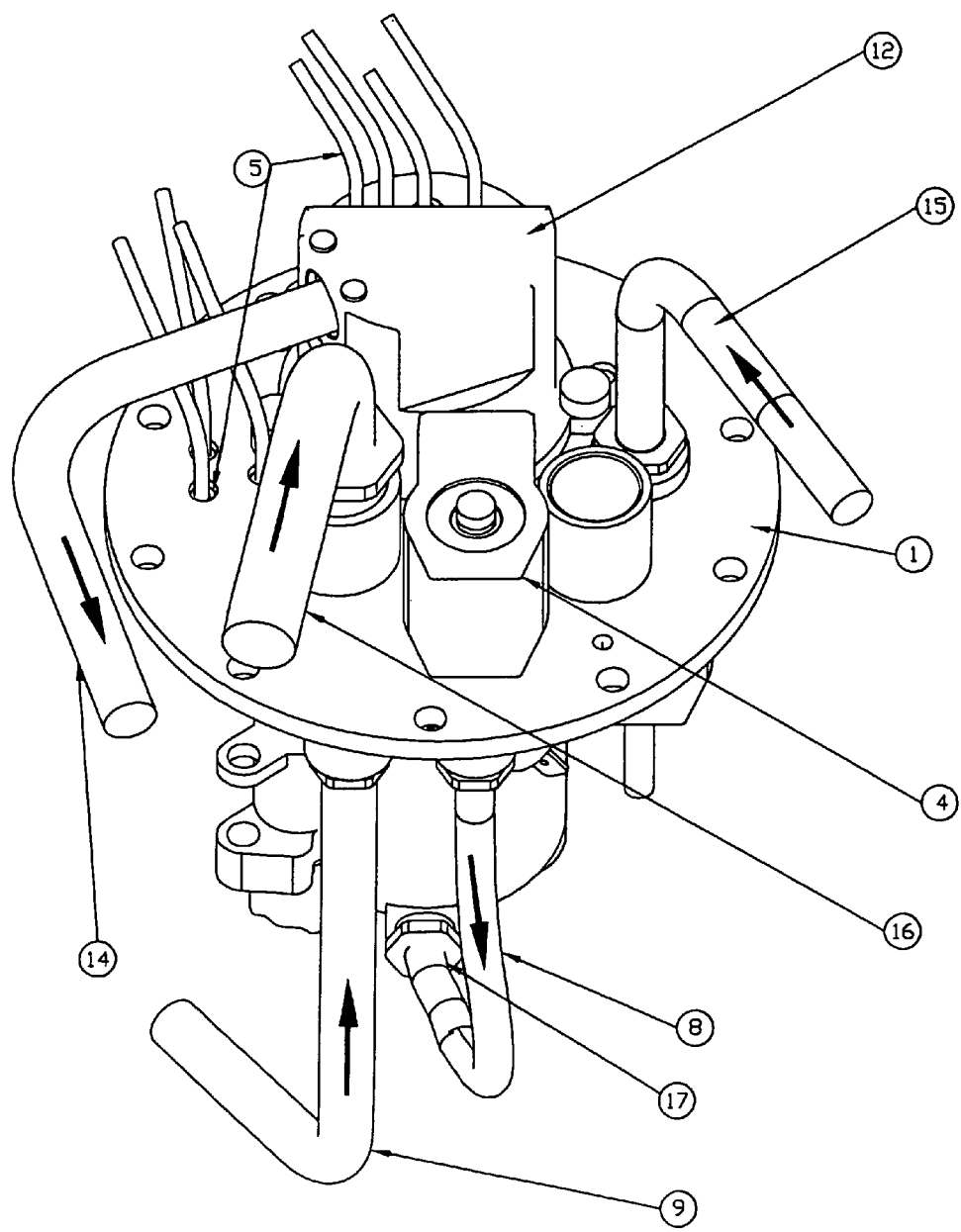
FIG. 5 shows an alternative embodiment of this invention.

In the following description, reference is made to the accompanying drawings of the preferred embodiment of the invention, which comprises:
a flange (1) integral with the fuel tank (18), of the type suited to supporting the ordinary assemblies and devices needed for the operation and safety of LPG (or similar fuel) supply systems, such as, for example, the fuel cut-off device (2), an electronic check valve (3), a supply valve (4), sealed electric power cable ducts (5);
the flange (1) also features:
a hole (6) large enough to fit the pump assembly;
a container (7), sealed together with the flange (1), at the hole (6), on the inside of the fuel tank, which container (7) is large enough to house the pump assembly and is provided with a connection (17) for attaching the LPG intake pipe;
an LPG pump assembly (11);
a cap (12) for sealing the container (7) housing the pump assembly (11), which cap (12) is screwed to the external face of the flange (1), at the hole (6), by means of screws (13) or other known fastening means;
a fuel suction pipe (9) conveying the LPG from the tank (18);
a fuel intake pipe (8) conveying the LPG from the suction pipe (9) into the container (7);
a device (10) for shutting off/opening the flow of LPG from the fuel suction pipe (9) via the fuel intake pipe (8) to the container (7) housing the pump assembly (11);
a means for releasing the container (7), the container cap (12) and the section of pipe (8) downstream from the device for shutting off the flow (10) of residual LPG, after the said device (10) has been closed;
an electronic supply valve (4);
a fuel supply pipe (16);
a fuel return pipe (15);
a connection (17), at the bottom of the container (7), connecting the pipe (8) with the container (7).

According to the present invention, therefore, the flange (1) features—in addition to the ordinary flanges fitted on LPG vehicle tanks, and the like, to support the devices and assembled for the operation and safety of the engine—a hole (6), large enough to fit the LPG pump assembly (11); a sealed container (7) is fastened at the hole (6), on the side facing the inside of the tank (18), which container (7) is connected, by means of a fuel intake pipe (8), to the fuel suction pipe (9) from the tank (18); between the intake pipe (8) and the suction pipe (9) from the tank there is disposed a tap cock (10) for shutting off the flow of LPG; the tap cock (10) can be opened/closed from the outside of the flange; the pump assembly (11) is introduced inside the container (7) through the hole (6), present on the flange (1), which pump assembly (11) is sealed beforehand by the cap (12); the cap (12) is then fastened to the flange (1) by means of screws (13), thus creating a sealed container housing the pump assembly (11).

As mentioned above, the container (7) housing the pump assembly (11), covered at the top by the cap (12), receives the fuel via the intake pipe (8) through the tap cock (10), which, in turn, is connected to the suction pipe (9) conveying the fuel from the tank (18). In this manner, a sufficient amount of fuel needed to operate the pump assembly (11) is always secured inside the container (7).

The pump assembly (11) drives the fuel inside the container (7) through the pipe (14) to the fuel supply line of the engine, at the requisite pressure.

In short, the container (7)—together with the pump assembly (11) and the cap (12)—constitutes a sealed container, into which flows only the amount of fuel necessary to operate the pump assembly (11), and the flow of fuel from the tank (18) to the sealed container (7) housing the pump assembly (11), can be shut off by closing the tap cock (10).

This solution, as mentioned above, enables the removal of the pump assembly (11), once the flow of LPG to the container (7) has been shut off by means of the tap cock (10), and after having drained the small amount of LPG present in the sealed container (7) and in the section of pipe downstream from the tap cock (10), by means of a valve or other means, thus preventing the fuel contained inside the tank (18) from coming out.

According to an alternative embodiment, the means for shutting off the flow of LPG into the container (7) may consist of an electronic valve—fitted between the fuel suction pipe (9) and the fuel intake pipe (8) supplying the container (7), which electronic valve may be activated by means of a switch or automatically controlled by switching off the pump assembly (11).

If the means for shutting off the flow of fuel consists of an electronic valve, it is beneficially possible to place the electronic supply valve (4) in the place of the tap cock (10).

In the above case, it is possible to provide for the electronic valve to close when not operating and open when the fuel is supplied.

Based on the manufacturer's requirements, the container (7) can be made integral with the flange (1), at the hole (6), using fastening devices such as screws, or welded to the flange (1), or manufactured as a single piece.

Of course, in order to ensure the seal of the container, the cap, the pipe conveying the fuel to the fuel supply line of the engine, and all the electric power cable ducts passing through the flange, gaskets shall be provided preventing any leaks of fuel.

The invention claimed is:

1. An assembly housed inside an LPG fuel tank for motor vehicles, said assembly comprising:
    an LPG pump;
    a support flange configured to support system operating and safety devices, said support flange being inside the LPG fuel tank and including a hole sufficiently large to permit removal of the LPG pump from inside the LPG fuel tank without a need to empty the LPG fuel tank first;
    a container configured to house the LPG pump, said container being sealed to and integral with the support flange at the hole inside the LPG fuel tank;
    a cap configured to seal the container housing the LPG pump;
    a fuel suction pipe configured to convey LPG from the LPG fuel tank;
    a fuel intake pipe configured to convey the LPG from the fuel suction pipe into the container;
    a flow control device, disposed between the fuel intake pipe and the fuel suction pipe, and configured to shut off or open flow of the LPG from the fuel suction pipe via the fuel intake pipe to said container before the LPG flows to the container housing the LPG pump, said flow control device being completely arranged on the support flange between the fuel intake pipe and the fuel suction pipe, and being operable from outside the LPG fuel tank;
    a fuel supply pipe for supplying said fuel to an engine and being connected to said engine and passing through the cap;
    a device configured to empty the container, the cap and a section of the fuel supply pipe downstream from the flow control device of any LPG remaining after the flow control device has been closed; and
    a return pipe configured to return the LPG to the LPG fuel tank.

2. The assembly as claimed in claim 1, wherein the flow control device is a tap cock.

3. The assembly as claimed in claim 1, wherein the flow control device is an electronically-operated valve.

4. The assembly as claimed in claim 1, wherein the flow control device is an electronic valve operated automatically in response to a failed operation of the LPG pump.

5. The assembly as claimed in claim 1, wherein the assembly is constructed and arranged such that when the flow of the LPG into the container is shut off by the flow control device, the LPG is prevented from spilling out of the LPG fuel tank when the cap of the container is removed to extract the LPG pump.

6. The assembly as claimed in claim 3, wherein the electronically-operated valve is fitted in place of a tap cock.

7. The assembly as claimed in claim 3, wherein the electronically-operated valve is closed when in an idle position and is open when the LPG flows from the fuel suction pipe.

8. The assembly as claimed in claim 3, wherein said electronically-operated valve is closed in the idle position and open when fuel is supplied.

9. The assembly as claimed in claim 1, further comprising a fuel cut-off device supported on said support flange.

10. The assembly as claimed in claim 1, further comprising an electronic check valve supported on said support flange.

11. The assembly as claimed in claim 1, further comprising gaskets for preventing any leaks of said LPG.

12. The assembly as claimed in claim 1, wherein said container is fastened to said support flange by means of fastening devices.

13. An assembly housed inside an LPG fuel tank for motor vehicles, said assembly comprising:
    an LPG pump;
    a support flange configured to support system operating and safety devices, said support flange being inside the LPG fuel tank and including a hole sufficiently large to permit removal of the LPG pump from inside the LPG fuel tank without a need to empty the LPG fuel tank first;
    a container configured to house the LPG pump, said container being sealed to and integral with the support flange at the hole inside the LPG fuel tank;

a cap configured to seal the container housing the LPG pump;

a fuel suction pipe configured to convey LPG from the LPG fuel tank;

a fuel intake pipe configured to convey the LPG from the fuel suction pipe into the container;

a flow control device, disposed between the fuel intake pipe and the fuel suction pipe, and configured to shut off or open flow of the LPG from the fuel suction pipe via the fuel intake pipe to said container before the LPG flows to the container housing the LPG pump, said flow control device being completely arranged on the support flange between the fuel intake pipe and the fuel suction pipe, said flow control device being operable from outside the LPG fuel tank;

a fuel supply pipe for supplying said fuel to an engine and being connected to said engine;

a device configured to empty the container, the cap and a section of the fuel supply pipe downstream from the flow control device of any LPG remaining after the flow control device has been closed; and a return pipe configured to return the LPG to the LPG fuel tank.

\* \* \* \* \*